3,016,377
Δ⁸⁽⁹⁾ - 7,11 - DIOL DERIVATIVES OF THE ERGO-
STANE, CHOLANE AND SPIROSTANE SERIES
Earl M. Chamberlin, Westfield, and John M. Chemerda,
Metuchen, N.J., assignors to Merck & Co., Inc., Rahway, N.J., a corporation of New Jersey
No Drawing. Filed July 26, 1955, Ser. No. 524,580
8 Claims. (Cl. 260—239.55)

This invention is concerned with novel chemical compounds of the cyclopentanopolyhydrophenanthrene series and processes for preparing the same; more particularly, it relates to novel cyclopentanopolyhydrophenanthrene compounds having functional substituents in ring C; and specifically it relates to new compounds having a hydroxyl or keto substituent at the 11 position, and to processes for the preparation of such compounds.

This application is a continuation in part of our application Serial No. 215,026 filed March 10, 1951 now abandoned, copending application Serial No. 247,561 filed September 20, 1951 now abandoned, and Serial No. 247,562 also filed September 20, 1951, now Patent No. 2,854,464.

Compounds of the adrenal cortex, such as Kendall's Compound E (Cortisone) have been found to be of great value in the treatment of various diseases. Further, it is likely that Kendall's Compound E and/or other closely related 11-hydroxy steroids will find increasing therapeutic use in the future. Unfortunately, the only method for the preparation of such compounds presently available utilizes desoxycholic or cholic acids as the starting material. Cholic and desoxycholic acids have hydroxy substituents in ring C at the 12 position, thus providing a means for introducing a functional substituent at the 11 position. However cholic and desoxycholic acids, which are obtained from animal bile, are only available in limited amounts. Heretofore no practical method was available whereby a functional group could be introduced in ring C which would permit the use of more abundant steroids such as the sterols, ergosterol, cholesterol, stigmasterol, or plant sapogenins, such as diosgenin, tigogenin, and the like.

It is an object of the present invention to provide a process for introducing a functional group in ring C at the 11 position. It is a further object to provide a process for converting cyclopentanopolyhydrophenanthrene compounds having a double bond in the 7:8 position to the corresponding cyclopentanopolyhydrophenanthrene compound having a hydroxyl or keto group at positions 7 and 11. Another object is to provide new compounds of the steroid series having functional groups in ring C suitable for the preparation of other cyclopentanopolyhydrophenanthrene compounds. Other objects will be apparent from the detailed description hereinafter provided.

In accordance with our invention, we have now found that compounds of the cyclopentanopolyhydrophenanthrene series having an 11-keto substituent can be synthesized by reactions indicated as follows:

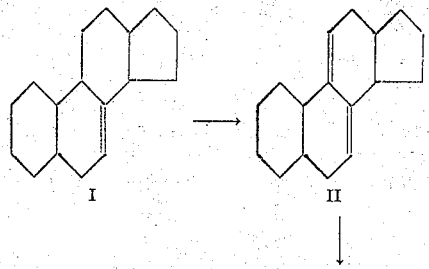

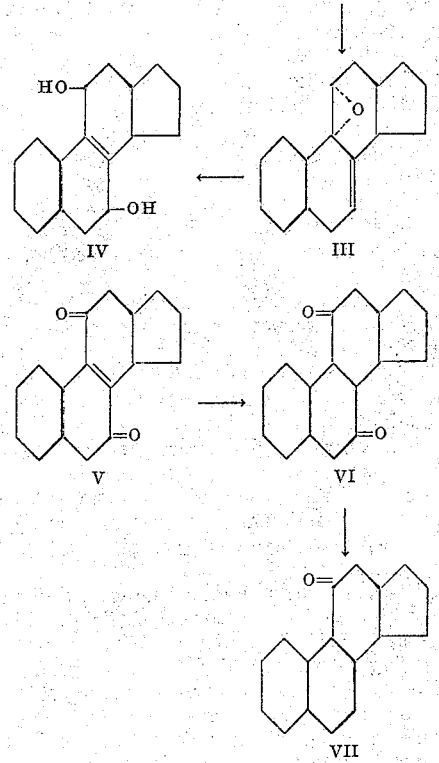

These reactions are carried out as follows:

A cyclopentanopolyhydrophenanthrene compound having a 7:8 double bond (I) is reacted with mercuric acetate producing the corresponding compound having conjugated double bonds in the 7:8 and 9:11 positions (II) which is treated with a per acid, thus forming an epoxide represented by the III. This epoxide is then treated with an adsorbent to form the corresponding Δ⁸-7,11-dihydroxy compound (IV).

The Δ⁸-7,11-dihydroxy compound (IV) is reacted with an oxidizing agent to convert the hydroxy substituents to keto groups, thus obtaining the corresponding Δ⁸-7,11-diketo cyclopentanopolyhydrophenanthrene derivatives (V). These diketo compounds are then reduced to saturate the Δ⁸ double bond and form the corresponding 7,11-diketo compound VI. The saturated diketo compound is then reduced to eliminate the 7-keto substituent, thus producing the corresponding 11-keto compound (VII). The latter compounds are useful intermediates for the preparation of 11-keto compounds having desirable therapeutic properties.

In accordance with the reactions described above cyclopentanopolyhydrophenanthrene compounds having double bonds in positions 7:8 and 9:11 are converted to the corresponding epoxide derivative; for example compounds such as ergosterol D, acyl derivatives of ergosterol D, 3-hydroxy-Δ⁷,⁹⁽¹¹⁾-bisnorallocholadienic acid or esters thereof, 3-acyloxy-Δ⁷,⁹⁽¹¹⁾-bisnorallocholadienic acid or esters thereof, 3-hydroxy-Δ⁷,⁹⁽¹¹⁾-choladienic acid or esters thereof, 3-acyloxy-Δ⁷,⁹⁽¹¹⁾-choladienic acid or esters thereof, Δ⁷,⁹⁽¹¹⁾-dehydrotigogenin or acyl derivatives thereof, Δ⁷,⁹⁽¹¹⁾-allopregnadiene-3-ol-20-one or its acyl derivatives, and the like are converted to the corresponding epoxide compounds.

The epoxides of Δ⁷,⁹⁽¹¹⁾-cyclopentanopolyhydrophenanthrene compounds, such as the epoxides of ergosterol D, acyl derivatives of ergosterol D, 3-hydroxy-Δ⁷,⁹⁽¹¹⁾-bisnorallocholadienic acid or its esters, 3-acryloxy-Δ⁷,⁹⁽¹¹⁾-bisnorallocholadienic acid or its esters, 3-hydroxy-Δ⁷,⁹⁽¹¹⁾-choladienic acid or its esters, Δ⁷,⁹⁽¹¹⁾-dehydrotigogenin or its acyl derivatives, Δ⁷,⁹⁽¹¹⁾-allopregnadiene-3-ol-20-one or its acyl derivatives, and the like are converted to the corresponding Δ⁸-7,11-dihydroxy derivatives.

Cyclopentanopolyhydrophenanthrene compounds having 7,11-diketo substituents such as, 3-acyloxy-7,11-diketo-Δ⁸,²²-ergostadiene, 3-acyloxy-7,11-diketo-Δ⁸-bisnorallocholenic acid and its esters, 3-acyloxy-7,11-diketo-Δ⁸-cholenic acid and its esters, 3-acyloxy-7,11-diketo-Δ⁸-tigogenin, Δ⁸-allopregnene-3-ol-7,11-20-trione and its acyl derivatives, and the like can be obtained by the oxidation of the corresponding 7,11-dihydroxy compounds. Further, these diketo compounds may be reduced to the corresponding compounds having a saturated bond in the 8:9 position.

The 7,11-diketo cyclopentanopolyhydrophenanthrene compounds can be reduced to the corresponding 11-keto compounds. We prefer to effect this reduction by reacting the 7,11-diketo compound with hydrazine hydrate and an alkali metal hydroxide at elevated temperatures in a high boiling solvent medium, for example, diethylene glycol. It is surprising that under these reaction conditions the 11-keto group is not simultaneously reduced along with the 7-keto group. On the contrary, we have found that under optimum conditions excellent yields of the desired 11-keto compounds are obtained by this reduction process.

Thus, in accordance with the processes described above 3-hydroxy-11-keto-Δ²²-ergostene, 3-hydroxy-11-keto-bisnorallocholanic acid, 3-hydroxy-11-ketotigogenin, and the corresponding esters, acyl derivatives, or esterified acyl derivatives can be prepared from the corresponding 7,11-diketo compounds. If desired, these 3-hydroxy-11-keto compounds may be oxidized to obtain the 3,11-diketo compounds in accordance with methods known in the art.

The Δ⁷,⁹⁽¹¹⁾-compounds of the cyclopentanopolyhydrophenanthrene series are conveniently prepared by reacting the corresponding Δ⁷-compound with mercuric acetate. We have found that this reaction is preferably effected by reacting the Δ⁷-compound with mercuric acetate and glacial acetic acid in the presence of a suitable solvent medium such as chloroform. The reaction is conveniently conducted by stirring the reaction mixture for 16-24 hours. After the reaction is completed, the Δ⁷,⁹⁽¹¹⁾-compound is recovered from the reaction mixture by removing the precipitated mercurous acetate, and concentrating the solution under diminished pressure. If desired, the residue may be further purified by crystallization from suitable solvents. Thus, this process can be utilized to prepare Δ⁷,⁹⁽¹¹⁾-pregnadiene-3-ol-20-one-3-acetate, and Δ⁷,⁹⁽¹¹⁾-dehydrotigogenin acetate from Δ⁷-pregnenolone acetate and Δ⁷-dehydrotigogenin acetate respectively. Alternatively, other acyl derivatives of these starting materials or the 3-hydroxy compounds may be utilized as starting materials in our process to prepare the corresponding Δ⁷,⁹⁽¹¹⁾-compounds.

Further, the 3-hydroxy-Δ⁷,⁹⁽¹¹⁾-choladienic acid, which is also useful as a starting material in the processes of our invention, is readily obtained by reducing 3-hydroxy-12-keto-Δ⁷,⁹⁽¹¹⁾-choladienic acid. This is conveniently accomplished by reacting the keto acid with hydrazine hydrate and an alkali metal hydroxide in the presence of a suitable high boiling solvent such as diethylene glycol.

This invention is concerned with substituted androstenes and etiocholenes having a double bond in the 8:9 position, hydroxy substituents at positions 3,7 and 11, and a substituent containing at least two carbon atoms at position 17 joined to the nucleus by a carbon to carbon bond, and the 3-acyloxy derivatives thereof wherein the acyl group is a lower fatty acid radical. These compounds can be represented structurally as follows:

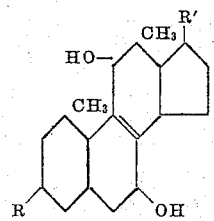

wherein R represents hydroxy or acyloxy wherein the acyl group is a lower fatty acid radical and R' represents substituents of at least two carbon atoms joined to the nucleus by a carbon to carbon bond.

The starting materials used in the process of this invention, namely, the epoxides shown by the Formula III, may be obtained as described in our application, Serial No. 215,026, filed March 10, 1951.

Pursuant to our invention, we have found that the epoxide compound can be reacted with an acidic adsorbent to produce the corresponding Δ⁸·⁹-7,11-dihydroxy compound. In carrying out this reaction, we find that it is preferable to react the epoxide and the adsorbent material in an inert solvent medium such as benzene or ether. Although various acidic adsorbents may be used for this purpose, such as silica or acid washed alumina we find it especially convenient to employ an acid washed adsorbent, such as acid washed alumina, since these products are more active and effect the desired reaction in a very short time. In carrying out this reaction in accordance with our preferred procedure, a solution of the epoxide in an inert solvent medium is passed through a chromatographic column containing acid washed alumina or silica. Alternatively, the reaction can also be effected by mixing the adsorbent with the epoxide, preferably if a suitable mixture of the adsorbent and the epoxide is permitted to stand for a period of time sufficient to convert substantially all of the epoxide to the corresponding Δ⁸·⁹-7,11-dihydroxy compound. The time required for completing this reaction varies somewhat depending both on the structure of the epoxide treated and the particular adsorbent being utilized. In general, with an acid washed adsorbent such as alumina, the reaction is complete in about 3-5 hours for compounds in the cholic acid series, while corresponding compounds in the ergosterol series may require from 1 to 4 days to complete the reaction.

After the reaction is completed, the adsorbent material is first eluted with a non-polar solvent such as petroleum ether, benzene, or ethyl ether to remove any unreacted epoxide, or any other impurities, and then with a polar solvent such as a lower aliphatic alcohol or mixtures of a lower aliphatic alcohol and a non-polar solvent to elute the desired Δ⁸·⁹-7,11-dihydroxy compound. Generally, we find that methanol, or mixtures of chloroform and methanol are particularly suited for eluting the Δ⁸-7,11-dihydroxy compound. The product is then recovered from the polar eluting solvent by evaporation to dryness. The residue so obtained may be purified by recrystallization from organic solvents in accordance with conventional chemical practice.

Thus, by the above-described procedure, various epoxides of Δ⁷,⁹⁽¹¹⁾-cyclopentanopolyhydrophenanthrene compounds, such as the epoxides of ergosterol D, acyl derivatives of ergosterol D, 3-hydroxy-Δ⁷,⁹⁽¹¹⁾-bisnorallocholadienic acid or its esters, 3-acyloxy-Δ⁷,⁹⁽¹¹⁾-bisnorallocholadienic acid or its esters, 3-hydroxy-Δ⁷,⁹⁽¹¹⁾-choladienic acid or its esters, 3-acyloxy-⁷,⁹⁽¹¹⁾-choladienic acid or its esters, Δ⁷,⁹⁽¹¹⁾-dehydrotigogenin or its acyl derivatives, Δ⁷,⁹⁽¹¹⁾-allopregnadiene-3-ol-20-one or its acyl derivatives, and the like are converted to the corresponding Δ⁸-7,11-dihydroxy derivatives.

The epoxide compounds described above are valuable compounds which are useful as intermediates in the preparation of adrenal hormones such as cortisone. Thus, as shown above, the epoxides of ergosterol D can be converted to 3-hydroxy-11-keto-bisnorallocholanic acid, the methyl 3-acetoxy-$\Delta^{7,9(11)}$-bisnorallocholadienate-9,11-epoxide can also be converted to 3-hydroxy-11-keto-bisnorallocholanic acid, and $\Delta^{7,9(11)}$-dehydrotigogenin acetate epoxide can be converted to 11-keto-tigogenin.

The 11-keto compounds obtained by the procedures described above, for example, 3-hydroxy-11-keto-bisnorallocholanic acid and 11-keto-tigogenin, can be readily converted to cortisone. Thus, by employing 3-hydroxy-11-keto-bisnorallocholanic acid as the starting material in place of the 3-hydroxy-11-keto-bisnorcholanic acid in the synthesis of cortisone described in U.S. Patent 2,492,188, the bisnorallocholanic acid can be converted to the allo compound corresponding to intermediate XXIV of this patent, namely, a compound of the following structural formula

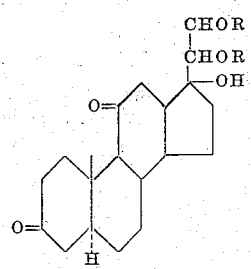

This compound can then be brominated to form the corresponding 2,4-dibromo compound. Upon treating this dibromo compound with sodium iodide in acetone solution it is converted to the corresponding 2-iodo compound which on reaction with chromous chloride yields the $\Delta^4$-3-keto compound which is compound XXVI of Pat. 2,492,188. This latter product can then be converted to cortisone following the procedures described in this patent.

11-keto-tigogenin is similarly a valuable intermediate in the synthesis of cortisone. Thus, 11-keto-tiganenin can be oxidized by reaction with chromium trioxide to obtain the corresponding 3,11-diketo compound. This compound can then be treated by the procedures described in Chemical and Engineering News, volume 27 pages 3348–3349 to form $\Delta^{16}$-3-11,20-triketo-allopregnene, and this compound can be further treated to introduce hydroxy substituents at positions 17 and 21. The $\Delta^{16}$-3,11,20-triketo-17,21-dihydroxy pregnene can then be catalytically hydrogenated to produce the saturated allopregnane compound. The 3,11,20-triketo-17,21-dihydroxy allopregnane can then be converted to cortisone following the procedures described in J. Am. Chem. Soc. 72, pages 4077–4080 for the introduction of a $\Delta^4$-double bond in 3-keto allosteroids.

Alternatively, other methods can also be utilized to convert the 11-keto steroids of the present invention to cortisone. Thus, the side chain at C–17 of 3-hydroxy-11-keto bisnorallocholanic acid and the esters and acylated derivatives thereof can be degraded by the application of the Barbier-Wieland method to obtain 3-hydroxy-11,20-diketo-allopregnane. For example, methyl 3-acetoxy-11-keto-bisnorallocholanate can be reacted with phenylmagnesium bromide in benzene to form the corresponding 22-hydroxy-22,22-diphenyl compound which on dehydration with acetic acid to the $\Delta^{21}$-22,22-diphenyl compound followed by oxidation with ozone yields 3-hydroxy-11,20-diketo allopregnane. Upon reacting the latter compound with lead tetra-acetate in glacial acetic acid 3,21-diacetoxy-11,20-diketo allopregnane is obtained. Reaction of this compound with hydrogen cyanide in ethanol yields the cyanohydrin, 3,21-diacetoxy-11-keto-20-hydroxy-20-cyano-allopregnane which on dehydration with phosphorous oxychloride in the presence of pyridine is converted to the $\Delta^{17(20)}$-20-cyano compound and is then partially esterified by reaction with acetic anhydride to form the corresponding 21-acetoxy ester. Oxidation of this 21-acetoxy ester by reaction with chromic acid in acetic acid affords the corresponding 3-keto compound, $\Delta^{17(20)}$-3,11-diketo-20-cyano-21-acetoxy allopregnene. Treatment of this compound with osmium tetroxide in dry pyridine forms the 17,20-osmate ester which on reaction with sodium sulfite is cleaved to form 3,11,20-triketo-17-hydroxy-21-acetoxy allopregnane. Bromination of the latter compound affords the 2,4-dibromo compound which on treatment with sodium iodide in acetone solution is converted to the corresponding 2-iodo compound. Reaction of this iodo compound with chromous chloride yields cortisone acetate.

Alternatively, other methods can be employed to convert the 3-hydroxy-11,20-diketo allopregnane to cortisone acetate. For example, the 3-hydroxy-11,20-diketo allopregnane can be reacted with acetic anhydride in the presence of p-toluene sulfonic acid to produce $\Delta^{17(20)}$-3,20-diacetoxy-11-keto allopregnene. Upon reacting the latter compound with perbenzoic acid in chloroform solution and saponifying the resulting reaction product with an alkali, 3,17($\alpha$)-dihydroxy-11,20-diketo allopregnane is obtained. This compound is then treated with bromine in acetic acid to form the corresponding 21-bromo compound which on treatment with potassium acetate and sodium iodide in acetone forms 3,17($\alpha$)-dihydroxy-11-keto-21-acetoxy allopregnane. Oxidation of this compound with N-bromoacetamide yields the corresponding 3-keto compound. By reacting this 3-keto compound with bromine to form the 2,4-dibromo derivatives, converting this dibromo compound to the 2-iodo compound, and reacting the iodo compound with chromous chloride, cortisone acetate is produced.

In a similar manner, 3-hydroxy-11-keto cholanic acid and the esters and acylated derivatives thereof can be converted by the application of the Barbier-Wieland degradation to obtain 3-hydroxy-11,20-diketo pregnane. For example, methyl 3-acetoxy-11-keto cholanate is reacted with phenylmagnesium bromide in benzene to form the corresponding 24-hydroxy-24,24-diphenyl compound which on dehydration with acetic acid followed by oxidation with ozone yields 3-hydroxy-11-keto-norcholanic acid. Upon reacting methyl-3-hydroxy-11-keto-cholanate with phenylmagnesium bromide and then dehydrating and oxidizing the resulting product, 3-hydroxy-11-keto-bisnorcholanic acid is obtained. Further degradation of this compound by this procedure via the 22-hydroxy-22-diphenyl and $\Delta^{21}$-22,22-diphenyl compounds yields 3-hydroxy-11,20-diketo pregnane. This compound can then be reacted with lead tetraacetate to obtain the 21-acetoxy derivatives which can then be converted to cortisone acetate following the procedures described in the Sarett Patent 2,541,105.

11-keto tigogenin is also useful in another way as an intermediate in the preparation of cortisone. Thus, 11-keto tigogenin can be reacted with acetic anhydride under pressure to obtain the corresponding pseudo-tigogenin acetate which on oxidation with chronic oxide and treatment of the resulting oxidized product with an alkali metal hydroxide is converted to 3,11,20-triketo-$\Delta^{16}$-allopregnene. Acetylation of this compound by reaction with acetic anhydride and reduction of the resulting acetate derivative with hydrogen in the presence of palladium on carbon yields 3-hydroxy-11,20-diketo allopregnane. This compound can then be converted to cortisone by the processes described above.

Thus, the processes of our invention provide a convenient and practical method whereby compounds of the cyclopentanopolyhydrophenanthrene series which do not contain a functional group in ring C may be converted to the corresponding 11-hydroxy or 11-keto compounds. Therefore, as indicated previously, the production of Kendall's Compound E and similar compounds containing an 11-keto or hydroxy group is no longer limited by the availability of relatively scarce and expensive raw materials such as cholic or desoxycholic acid, and these therapeutically important compounds can be prepared from the more abundant plant sterols, sapogenins and degradation products thereof.

The following examples are presented to illustrate specific embodiments of our invention.

EXAMPLE 1

*Preparation of 3-acetoxy-7,11-dihydroxy-$\Delta^{8,22}$-ergostadiene from ergosterol D acetate-9,11-epoxide*

8.6 grams of ergosterol D acetate-9,11-epoxide was dissolved in 100 cc. of benzene and 220 cc. of petroleum ether was added. This solution was chromatographed on a column of acid washed alumina (172 g. $Al_2O_3$).

The column was set up in acetone and washed with 1000 cc. of petroleum ether before the compound was put on.

The column was eluted successively with the following solvents:

Petroleum ether.
Petroleum ether/benzene_____ 4:1
Petroleum ether/benzene_____ 3:2
Petroleum ether/benzene_____ 2:3
Petroleum ether/benzene_____ 1:4
Benzene.
Ether.
Methanol.
Ethyl acetate.
Chloroform.

From the methanol elution there was obtained a fraction (535 mg.) which melted between 232–234° C. On recrystallization from chloroform-acetone the substance 3-acetoxy-7,11-dihydroxy-$\Delta^{8,22}$-ergostadiene melted at 240–242° C. $[\alpha]_D^{23}=+76$.

*Analysis.*—Calc. for $C_{30}H_{48}O_4$: C, 76.22; H, 10.24. Found: C, 76.04; H, 10.29.

EXAMPLE 2

*Preparation of 3-acetoxy-7,11-dihydroxy-$\Delta^{8,22}$-ergostadiene from ergosterol D-acetate-9,11-epoxide*

Thirteen grams of ergosterol D acetate epoxide was dissolved in 200 cc. of benzene and chromatographed on 390 g. of acid washed alumina. The chromatographic column was prepared in acetone and washed with benzene before the compound was put on.

The chromatograph was developed with the following solvents:

|  | cc. |
|---|---|
| Petroleum ether/benzene 4:1 | 1500 |
| Petroleum ether/benzene 3:2 | 2000 |
| Petroleum ether/benzene 2:3 | 2500 |
| Petroleum ether/benzene 1:4 | 2000 |
| Ether | 4500 |
| Methanol | 1500 |
| Ethyl acetate | 4500 |
| Acetone | 1500 |
| Chloroform | 1500 |

From the methanol fraction 2.7 g. of substance melting at 244° C. was obtained.

From the ethyl acetate, acetone and chloroform fractions 5.3 g. of 3-acetoxy-7,11-dihydroxy-$\Delta^{8,22}$-ergostadiene was obtained which on recrystallization from acetone melted at 245–247° C. Mixed with a sample of product from Example 1 the melting point was 244–246° C. $[\alpha]_D^{23}=+80$.

*Analysis.*—Calc. for $C_{30}H_{48}O_4$: C, 76.22; H, 10.24. Found: C, 76.28; H, 10.19.

The 3,7,11-triacetate derivative was obtained by treating the 7,11-dihydroxy compound with acetic acid and pyridine. M.P. 171-173° C.

*Analysis.*—Calc. for $C_{30}H_{52}O_6$: C, 73.34; H, 9.41. Found: C, 73.35; H, 9.03.

EXAMPLE 3

*Preparation of 3-acetoxy-7,11-dihydroxy-$\Delta^{8,22}$-ergostadiene from ergosterol D acetate*

309 grams of ergosterol D acetate was dissolved in 1876 cc. of benzene and oxidized at 10–15° C. with 107.6 g. of perbenzoic acid in 1775 cc. of benzene. The reaction mixture was allowed to stand overnight. It was washed twice with 630 cc. of a 5% potassium hydroxide solution, three times with 1000 cc. of water and dried over anhydrous magnesium sulfate.

Seventy cubic centimeters of the above solution was diluted with an additional 50 cc. of benzene and 100 g. of acid washed alumina was added. After standing four days the alumina was filtered off and washed as follows:

1000 cc. benzene at room temperature
6 x 300 cc. methanol at room temperature
500 cc. boiling methanol
500 cc. boiling chloroform.

The product from the cold methanol washes was taken up in hot methanol/chloroform and insoluble material was removed by filtration. On concentrating the filtrate to a small volume and seeding, 820 mg. of 3-acetoxy-7,11-dihydroxy-$\Delta^{8(9),22}$-ergostadiene (M.P. 238.5–240.5° C.) was obtained. $[\alpha]_D^{23}=+81.4°$.

EXAMPLE 4

*Hydrolysis of 3-acetoxy-7,11-dihydroxy-$\Delta^{8,22}$-ergostadiene to 3,7,11-trihydroxy-$\Delta^{8,22}$-ergostadiene*

Two hundred milligrams of 3-acetoxy-7,11-dihydroxy-$\Delta^{8,22}$-ergostadiene was refluxed with 15 cc. of 1 N potassium hydroxide in methanol. A crystalline precipitate was obtained after a short period of reflux and the mixture was refluxed for one hour. Upon dilution with water 3,7,11-trihydroxy-$\Delta^{8,22}$-ergostadiene precipitated out and was recovered by filtration. After recrystallization from methanol, the compound had a melting point, M.P. of 273–274° C.

*Analysis.*—Calc. for $C_{28}H_{46}O_3$: C, 78.13; H, 10.77. Found: C, 77.99; H, 10.91.

EXAMPLE 5

*Preparation of methyl 3-acetoxy-7,11-dihydroxy-$\Delta^8$-bisnorallocholenate from methyl 3-acetoxy-$\Delta^{7,9(11)}$-bisnorallocholadienate-9,11-epoxide*

One gram of methyl 3-acetoxy-$\Delta^{7,(11)}$-bisnorallocholadienate-9,11-epoxide was dissolved in 10 ml. of benzene. This solution was placed on a column of 30 g. of acid-washed alumina which had been prewashed with acetone and benzene. After standing for 5 days the column was eluted successively with 200 ml. of ether, a mixture of 45 ml. acetone and 105 ml. ether, a mixture of 120 ml. acetone and 80 ml. ether, 200 ml. of acetone and 250 ml. of methanol.

The fractions eluted by the acetone-ether mixtures were combined, and recrystallized from various solvents. Melting points were found to be quite variable and dependent on the rating of heating:

| | M.P., C. |
|---|---|
| Acetone | 225–251° |
| Ethyl acetate | 237–248° |
| Methanol | 218–230° |

In spite of these variations, a satisfactory analysis was obtained for the product, methyl 3-acetoxy-7,11-dihydroxy-$\Delta^8$-bisnorallocholenate, recrystallized from methanol and dried at 100° C. in vacuo for 3 hours.

*Analysis.*—Calc. for $C_{25}H_{38}O_6$: C, 69.09; H, 8.81. Found: C, 69.13; H, 9.02. $[\alpha]_D^{24}=+92.4°$ ($CHCl_3$).

EXAMPLE 6

*Preparation of methyl 3-acetoxy-7,11-dihydroxy-$\Delta^8$-cholenate from methyl 3-acetoxy-$\Delta^{7,9(11)}$-choladienate-9,11-epoxide*

A solution of 2 g. of methyl 3-acetoxy-$\Delta^{7,9(11)}$-choladienate-9,11-epoxide in 50 cc. benzene was stored at room temperature in contact with 40 g. of acid-washed alumina with occasional agitation for a period of four days.

The alumina was filtered off, washed free of unchanged oxide using six 50 cc. portions of benzene and then eluted in a column with methanol (250 cc.). The solid residue of methyl-3-acetoxy-7,11-dihydroxy-$\Delta^8$-cholenate (1 g.) obtained upon removal of methanol was purified by recrystallization from acetone, M.P. 193–197° C.

*Analysis.*—Calc. for $C_{27}H_{42}O_6$: C, 70.10; H, 9.15. Found: C, 70.20; H, 9.29.

EXAMPLE 7

*Preparation of methyl 3-acetoxy-7,11-dihydroxy-$\Delta^8$-cholenate from methyl 3-acetoxy-$\Delta^{7,9(11)}$-choladienate-9,11-epoxide*

A solution of 16 g. of methyl 3-acetoxy-$\Delta^{7,9}$-choladienate-9,11-epoxide in 400 cc. benzene was stored in contact with 320 g. acid-washed alumina at room temperature for five hours with occasional agitation.

The alumina was filtered off, washed free of unchanged oxide using six 300 cc. portions of benzene and then eluted in a column with 3200 cc. methanol.

Upon evaporation of the methanol, 7.2 g. of the methyl 3-acetoxy-7,11-dihydroxy-$\Delta^8$-cholenate was obtained. Purification was effected by triturating with small volume of petroleum ether and recrystallization from acetone. The purified sample (2.5 g.) melted at 194.8° C.

The above transformation is effected equally well when the reaction time is restricted to a period of three hours.

EXAMPLE 8

*Preparation of 3-acetoxy-7,11-dihydroxy-$\Delta^8$-tigogenin from $\Delta^{7,9(11)}$-dehydrotigogenin acetate-9,11-epoxide*

A solution of 0.78 g. of the epoxide in 20 ml. of benzene was slurried with 25 g. of acid washed alumina. After standing five days at room temperature, the mixture was filtered, and the alumina was washed with 75 ml. of benzene in several portions.

The alumina was washed with 50 ml. of hot methanol in several portions, then with 75 ml. of hot chloroform in portions. The combined methanol and chloroform washings were distilled in vacuo and the residue was flushed with a little methanol. The product, 3-acetoxy-7,11-dihydroxy-$\Delta^8$-tigogenin, which crystallized as fine needles, was collected on a filter and washed with methanol. Yield: 0.28 g., M.P. 250–254° C. $[\alpha]_D^{24} = +21°$ (CHCl$_3$).

Additional material was recovered from the methanol washings: 0.08 g., M.P. 245–51° C.

EXAMPLE 9

*Preparation of $\Delta^8$-allopregnene-3,7,11-triol-20-one-3-acetate from $\Delta^{7,9(11)}$-allopregnadiene-3-ol-20-one-3-acetate-9,11-epoxide*

To a solution of 1.43 g. of $\Delta^{7,9}$-allopregnadiene-3-ol-20-one-3-acetate-9,11-epoxide in 35 ml. of benzene was added 50 g. of acid-washed alumina. After standing five days at room temperature, the mixture was filtered and the alumina washed with 120 ml. of benzene. The alumina was then extracted with 120 ml. of hot methanol, and 120 ml. of hot chloroform. The combined methanol-chloroform extracts were concentrated to dryness, and the residue was recrystallized from methanol to give 0.85 g. of sandy prisms, M.P. 188–200° C. $[\alpha]_D^{24} = +141°$ (c=0.336, CHCl$_3$).

EXAMPLE 10

*Preparation of 3-acetoxy-7,11-dihydroxy-$\Delta^{8,22}$-ergostadiene from ergosterol D acetate-9,11-epoxide over silica gel*

Six and one-half grams of ergosterol D acetate-9,11-epoxide was dissolved in 100 cc. benzene and chromatographed on a mixture of 159 g. silica gel and 120 g. sea sand. The chromatograph column was prepared in acetone and washed with benzene before the compound was put on.

After washing the solution in with another 75 cc. benzene, the chromatograph was developed with the following solvents:

| | | |
|---|---|---|
| Petroleum ether/benzene | 2:3 cc. | 1250 |
| Petroleum ether/benzene | 1:4 cc. | 1000 |
| Ethyl ether | cc. | 1000 |
| Methanol | cc. | 1000 |
| Ethyl acetate | cc. | 1000 |
| Acetone | cc. | 1000 |
| Ethyl ether | | 800 |
| Hot methanol | | 600 |
| Chloroform | | 500 |

From the first ethyl ether fraction 0.15 g. of the 7,11-dihydroxy compound, melting at 235–238.5° C., was obtained.

From the methanol fractions 0.18 g. of the 7,11-dihydroxy compound was obtained which after recrystallizations from methanol and from acetone melted at 238–241° C. A mixed melting point with the product obtained by the alumina method (melting at 241–244° C.) was 328–240° C. $[\alpha]_D^{23} = +79°$.

*Analysis.*—Calc. for $C_{30}H_{48}O_4$: C, 76.22; H, 10.24. Found: C, 76.41; H, 10.40.

Various changes and modifications may be made in carrying out the present invention without departing from the spirit and scope thereof. Insofar as these changes and modifications are within the purview of the annexed claims, they are to be considered as part of our invention.

What is claimed is:

1. 3-acetoxy-7,11-dihydroxy-$\Delta^{8(9),22}$-ergostadiene.
2. Methyl 3-acetoxy-7,11-dihydroxy-$\Delta^{8(9)}$-bisnorallocholenate.
3. Methyl 3-acetoxy-7,11-dihydroxy-$\Delta^{8(9)}$-cholenate.
4. 3-acetoxy-7,11-dihydroxy-8(9)-dehydrotigogenin.
5. Lower alkyl esters of 3-hydrocarbonacyloxy-7,11-dihydroxy-$\Delta^{8(9)}$-cholenic acid wherein the acyl group is a lower fatty acid radical.
6. 3-hydrocarbonacyloxy-7,11-dihydroxy-$\Delta^{8,(9),22}$-ergostadiene wherein the acyl group is a lower fatty acid radical.
7. Lower alkyl esters of 3-hydrocarbonacyloxy-7,11-dihydroxy-$\Delta^{8(9)}$-bisnorallocholenic acid wherein the acyl group is a lower fatty acid radical.
8. 3-hydrocarbonacyloxy-7,11-dihydroxy-8(9)-dehydrotigogenin wherein the acyl group is a lower fatty acid radical.

References Cited in the file of this patent

FOREIGN PATENTS

| | | |
|---|---|---|
| 507,987 | Belgium | June 21, 1952 |
| 1,057,936 | France | Sept. 30, 1953 |

OTHER REFERENCES

Chamberlain: JACS, vol. 73, pages 2396–7, May 1951 (rec'd April 26, 1951).

Helvet Chem. Acta., August 1951, vol. 34, pages 2106–32.